United States Patent [19]

Egner et al.

[11] Patent Number: 4,684,161

[45] Date of Patent: Aug. 4, 1987

[54] FRANGIBLE PULLING BULLET

[75] Inventors: Walter A. Egner, Oberlin; Daniel R. Collins, Camp Hill, both of Pa.

[73] Assignee: AMP Incorporated, Harrisburg, Pa.

[21] Appl. No.: 935,062

[22] Filed: Nov. 21, 1986

Related U.S. Application Data

[63] Continuation of Ser. No. 764,270, Aug. 9, 1985, abandoned.

[51] Int. Cl.⁴ .................... F16G 11/10; B65H 59/00
[52] U.S. Cl. ........................... 294/1.1; 294/92; 254/134.3 FT; 350/96.1
[58] Field of Search .................. 294/1.1, 92; 254/134.3 FT, 134.3 CL; 29/234, 203 D; 24/234; 350/96.1

[56] References Cited

U.S. PATENT DOCUMENTS 2,815,976 12/1957 Hammit ........................... 294/1.1
3,858,848 1/1975 MacFetrich ............... 254/134.3 FT
4,411,409 10/1983 Smith ........................ 254/134.3 FT

*Primary Examiner*—James B. Marbert
*Attorney, Agent, or Firm*—Gerald K. Kita

[57] ABSTRACT

A pulling bullet 1 comprises, a frangible body having a coupling portion 18 for disconnect coupling to an optical connector 7, a cavity 21 in the body having a depth greater than the projecting length of an optical fiber cable 3 retained by the optical connector 7, the pulling bullet 1 covers the end of an optical fiber 6 of the cable 3, and a frangible web 28 surrounds an eye 25 for securing a hauling rope 27 to the pulling bullet 1.

11 Claims, 5 Drawing Figures

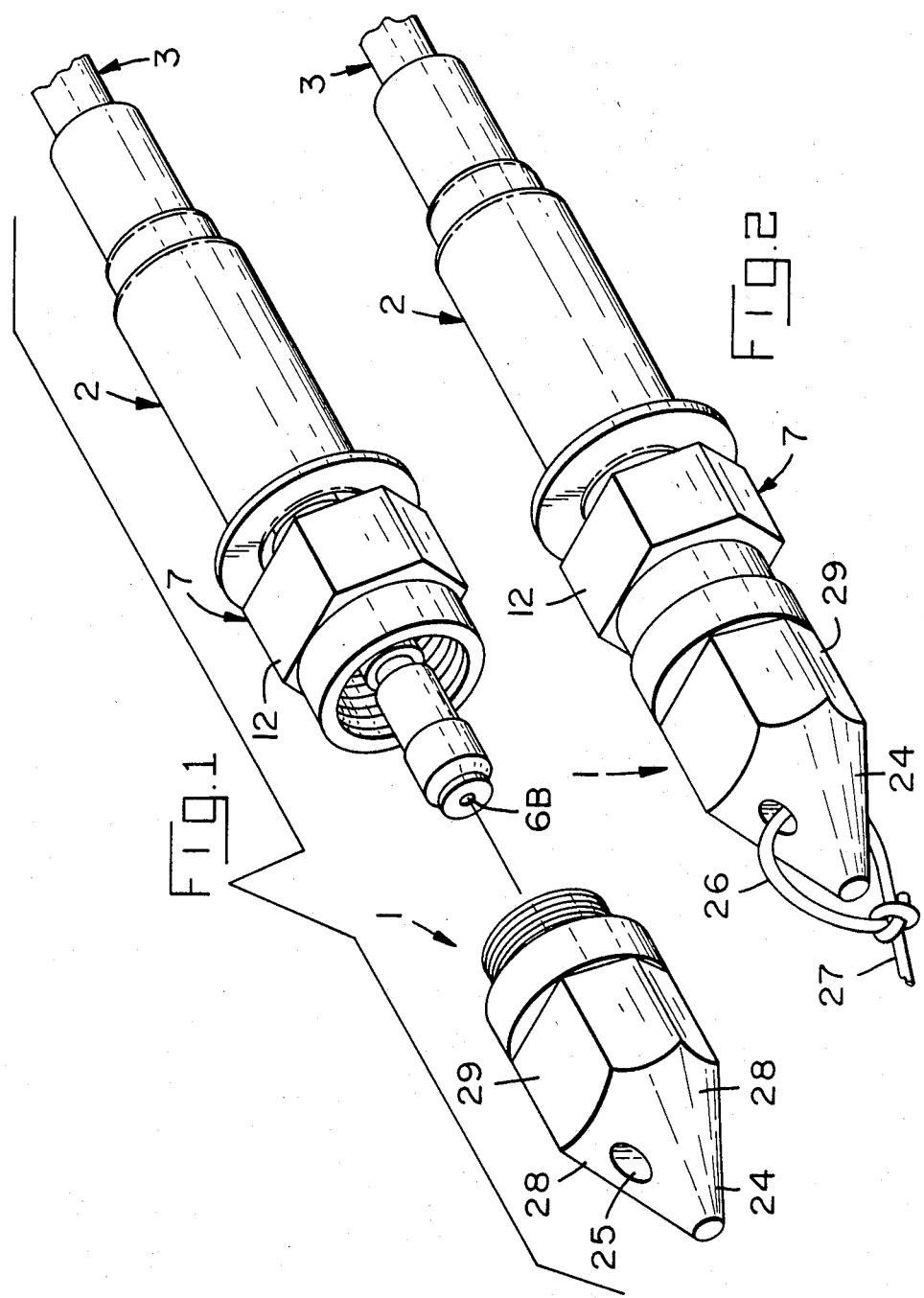

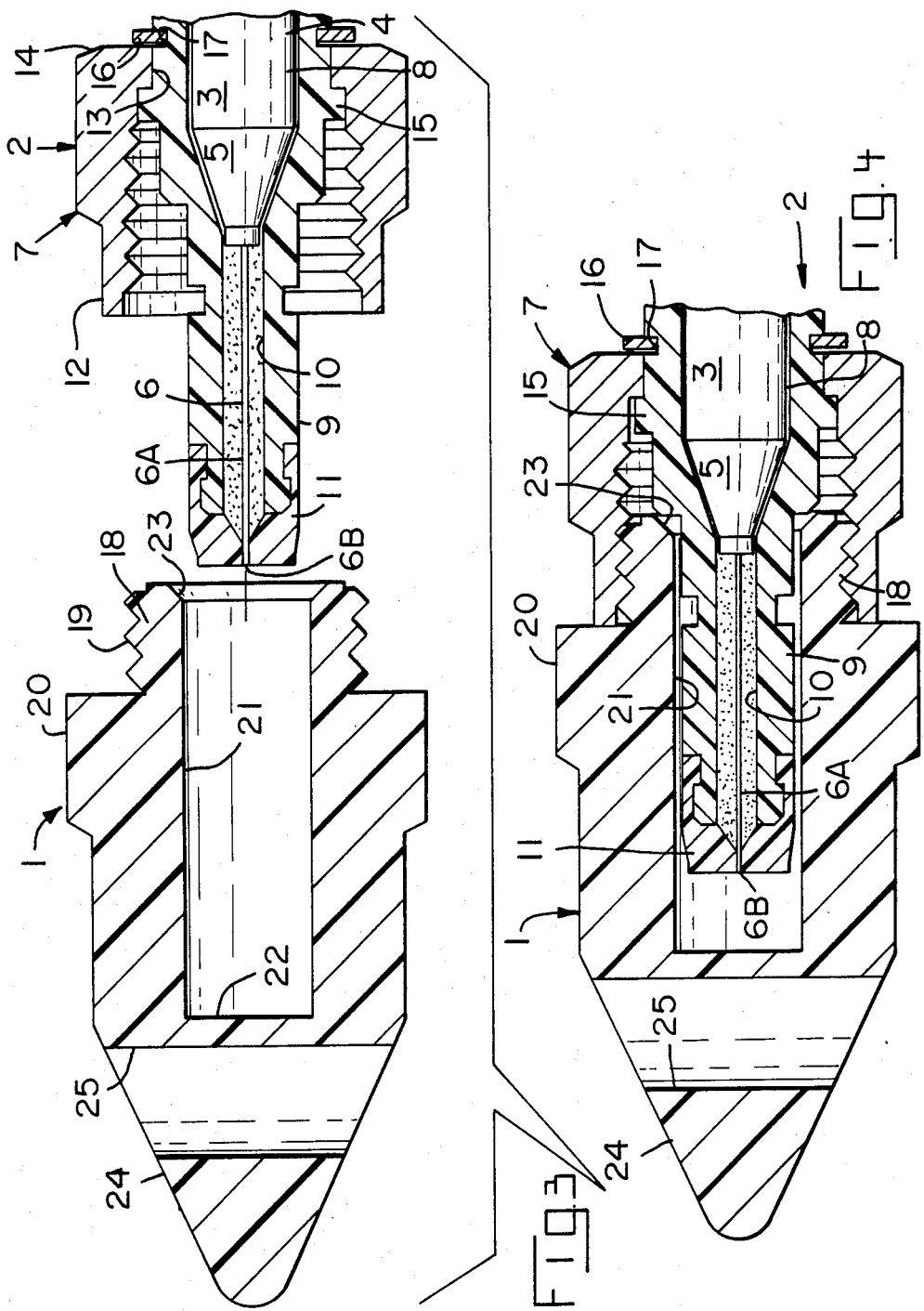

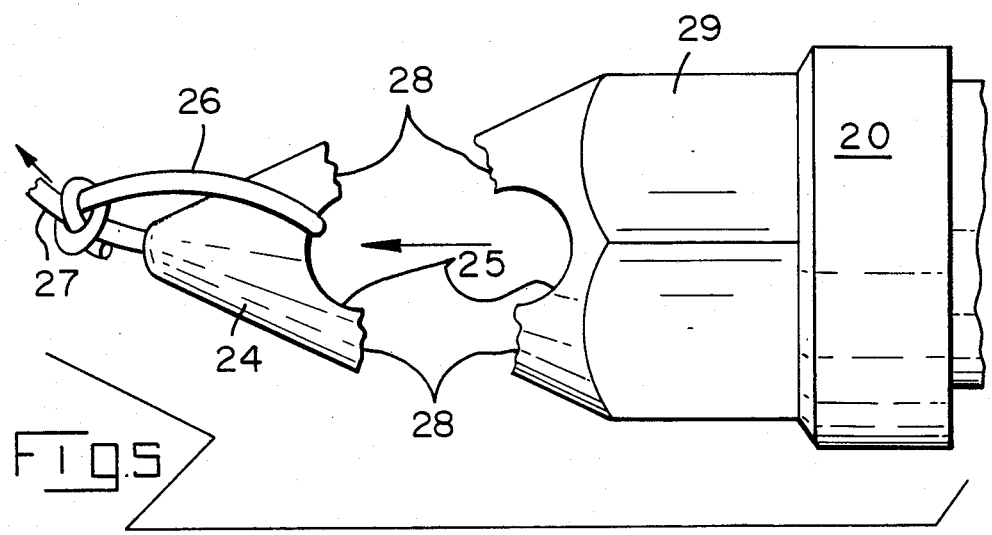

FRANGIBLE PULLING BULLET

This application is a continuation of application Ser. No. 764,270 filed Aug. 9, 1985, and now abandoned.

FIELD OF THE INVENTION

The invention relates to routing of an optical fiber cable assembly, and specifically to a device called a pulling bullet that pulls an optical cable assembly along a confined passage.

BACKGROUND OF THE INVENTION

Optical fiber cables which have optical connectors installed are known as optical cable assemblies. There is a need for installing an optical cable assembly along a confined passage, for example a passage behind a wall of a building or a passage along a hollow conduit or duct. A person who installs the assembly assembly must push or pull the assembly through the passage with the possibility that the assembly will break from undue friction or binding in the passage.

Installation of an optical cable assembly in a passage is similar to installation of electrical cable, in that electrical cable is often pulled through a confined passage. Electrical cable has metal conductors which are stronger than optical fibers. Consequently electrical cable will not be damaged, even when a person exerts considerable pulling force to overcome friction or binding of the electrical cable in the confined passage.

After electrical cable is routed to various locations, electrical connectors are applied to the cable at those locations. These electrical connectors are rugged and are capable of assembly to electrical cable without delicate assembly operations. Further, these electrical connectors are suitable for assembly to the cable subsequent to routing the cable in a building. Optical connectors are less rugged and require delicate assembly operations. Consequently, optical connectors are installed on optical cables in a factory or portable cabin wherein the environment is free of disturbance or contaminants and is conducive to performance of the delicate assembly operations.

SUMMARY OF THE INVENTION

The present invention resides in a means in the form of a pulling bullet for pulling an optical fiber cable and optical connectors through a confined passage. The pulling bullet covers and protects each polished optical fiber of the cable, and is temporarily attached to one of the connectors assembled with the cable. The pulling bullet also is rotatable with respect to the cable, thereby to avoid the application of torsion stresses on the cable during routing. The pulling bullet is frangible at the tension force limit of either the cable or the junction of the cable and an optical connector to which the pulling bullet is temporarily secured. Thereby the pulling bullet is frangible before damage is done to the cable or the junction, should binding or undue friction resist the cable from being pulled along by the pulling bullet. The frangible section of the pulling bullet is provided by an eye that receives a loop of a rope used for hauling the pulling bullet. Further the pulling bullet is molded in one piece with generous tolerances from inexpensive material, and thereby is designed to be disposable.

According to the invention a pulling bullet comprises, a frangible body having a coupling portion for disconnect coupling to an optical connector, a cavity in the body having a depth greater than the projecting length of an optical cable retained by the optical connector, means for maintaining separation of the pulling bullet from the cable, covering means for covering an end of an optical fiber of the cable, a transverse eye in the body, and means for dividing the eye.

An object of the invention is to provide a frangible means temporarily attached to an optical cable for pulling the cable along a route.

Another object is to provide a pulling bullet that is frangible at the tension force limit of an optical cable assembly, and that provides a protective cover for an optical fiber of the cable, and to which is attached a hauling rope for pulling the cable along a prescribed route.

Another object is to provide a pulling bullet that is inexpensive to manufacture and is assembled to an optical cable assembly as a contaminant cover.

Another object is to provide a pulling bullet having an eye for a hauling rope and a frangible web between the eye and the other surface of the pulling bullet.

These and other objects will become apparent from the detailed description of the invention taken in conjunction with the accompanying drawings.

DESCRIPTION OF THE DRAWINGS

FIG. 1 is a fragmentary perspective view with parts shown in exploded configuration of an optical cable assembly and a pulling bullet according to the invention.

FIG. 2 is a fragmentary perspective view of the parts shown in FIG. 1 assembled together.

FIG. 3 is an enlarged, fragmentary elevation view in section of the parts shown in FIG. 1.

FIG. 4 is an enlarged, fragmentary elevation view in section of the parts shown in FIG. 2.

FIG. 5 is an enlarged, fragmentary elevation view illustrating intentional fracture of the pulling bullet.

DESCRIPTION OF THE PREFERRED EMBODIMENT

FIGS. 1 and 3 illustrate a pulling bullet 1, according to the invention, and an optical cable assembly 2, to which the pulling bullet 1 is threadably coupled, as shown in FIGS. 2 and 4. The cable assembly 2 includes an optical cable 3 having an outer protective jacket 4 coaxially surrounding an elongated, flexible dielectric layer 5, in turn, coaxially surrounding an optical fiber 6 for transmitting optical signals. An optical connector 7 is assembled to an end 8 of the optical cable 3. The connector 7 includes a metal sleeve 9 having a central bore 10 that coaxially receives the optical cable 3. The jacket 4 and the dielectric layer 5 of the cable 3 is shaped to provide a frusto-conical portion from which protrudes a projecting portion 6A of the optical fiber 6. A solidifiable, fluent material 10 having a selected index of refraction is cast in the interior of the sleeve 9 and coaxially surrounds and supports the projecting portion 6A of the fiber 6. A dielectric alignment ferrule 11 on the end of the sleeve 9 coaxially surrounds and aligns the end 6B of the fiber 6, which end 6B is polished or cleaved to reduce signal transmission losses of optical signals transmitted through the end 6B.

An internally threaded coupling nut 12 has an opening 13 through one end 14 of the nut 12 for encircling the sleeve 9. The end 14 is interposed for rotation between an external surrounding collar 15 on the sleeve 9 and a resilient snap ring 16 frictionally mounted in an annular encircling groove 17 in the external surface of the sleeve 9. The end 6B of the optical fiber 6 and the alignment ferrule 11 project from the coupling nut 12 for disconnect coupling to another optical device, not shown, which is to be optically coupled to the optical signals transmitted through the end 6B of the optical fiber 6.

The pulling bullet 1 is a body of one piece, molded plastics construction, A reduced diameter end 18 of the pulling bullet 1 has an external threaded coupling portion 19 for disconnect coupling to the internally threaded nut 12. An external, radially projecting collar 20 encircles the periphery of the pulling bullet 1. The collar 20 is adjacent to the coupling portion 18 and is engaged by the nut 12 to limit movement of the pulling bullet 1 and connector 7 toward each other. The end 18 of the pulling bullet 1 has a length shorter than the threaded length of the nut 12.

An axially extending cavity 21 communicates with the end 18 of the pulling bullet 1 and freely receives therein the corresponding portions of the ferrule 11, sleeve 9 and optical fiber 6 that project from the nut 12. A bottom wall end 22 of the cavity 21 covers and protects the end 6B of the optical fiber 6 from contamination damage during routing of the cable assembly 2 through a confined passage, not shown. The nut 12 engages the collar 20, and thereby maintains a space between the end 6B of the optical fiber 6 and the bottom end 22 of the cavity 21. Thereby the end 6B of the fiber 6 is protected from damage by abrasion against the bottom end 22 of the cavity 21. A flared recess 23 surrounds the cavity 21 at the end 18 of the pulling bullet 1 and prevents engagement of the pulling bullet 1 with the remainder of the connector 7 or the optical cable 3. Thereby the end 18 of the pulling bullet 1 is constructed for securing to the rotatable nut 12 while freely and rotatably receiving the cable assembly 2.

To reduce frictional resistance of the nut 12 along a confined passage, not shown, the collar 20 is larger in diameter than the diameter of the optical connector 7. Further to reduce frictional resistance of the pulling bullet 1, a conical, tapered nose 24 forms the front end of the pulling bullet 1. A transverse eye 25 extends through the conical nose 24 and provides an means for securing a loop 26 in an end of a hauling rope 27 used for pulling the pulling bullet 1 along a confined passage. The nut 12 is freely rotatable to avoid torsion stresses from being applied to the optical cable assembly 2 should the rope 27 become twisted during hauling. A frangible web 28 surrounds the eye 25 and is formed between the eye 25 and the conical periphery of the nose 24. As shown in FIG. 5, the web 28 breaks to divide the eye 25 and permit separation of the hauling rope 27 from the optical cable assembly 2. The covering portion 22 of the pulling bullet 1 remains with the coupling portion 18 on the nut 12 to protect the optical fiber end 6B.

The breaking strength of the web 28 is calculated from the shear strength of the plastics material and the volume of material in the web 28. The size of the web 28 is then adjusted to possess a breaking strength of a desired amount less than the tension force limit of the cable assembly 2. The tension force limit may be the tensile strength of the cable 3 or the tension force limit of the junction of the cable 3 and the connector 7. Thus, the web 28 will break and protect the cable assembly 2 from damage if excessive tensile stresses are exerted by the hauling rope 27 or if the cable assembly 2 encounters excessive frictional resistance during transport by the rope 27.

A middle section 29 of the pulling bullet 1 has a hexagonal cross section for accommodating a standard wrench tool, not shown. The distance from the apex end of the nose 24 to the rear end of the hexagonal section is less than the socket depth of a commercially available socket wrench.

Although a preferred form of the invention is disclosed, other embodiments and modifications are intended to be covered by the appended claims, for example, an embodiment or modification wherein the end of the pulling bullet is constructed for coupling to the cable assembly by a means other than the threaded end 19.

We claim:

1. An optical cable assembly comprising:
an optical cable containing an optical fiber,
an optical connector assembled to the optical cable and encircling a signal transmitting end of the optical fiber,
and a pulling bullet for pulling the optical cable and the optical connector along a passage,
the optical connector including coupling means for disconnect coupling of the optical connector to the pulling bullet,
the pulling bullet having a covering means surrounding the signal transmitting end of the optical fiber,
the optical connector and the pulling bullet being coupled to each other and providing spacing means for spacing the covering means from the signal transmitting end of the optical fiber and preventing abrasion thereto,
the pulling bullet having securing means for securing a hauling means for pulling the pulling bullet along a passage,
a junction of the optical cable and the optical connector having a tension force limit,
the optical cable having a tensile strength, and
the securing means having a frangible means with a breaking strength less than said tension force limit and less than said tensile strength for breaking and separating from the hualing means thereby protecting the optical cable and the optical connector from damage.

2. The optical cable assembly as recited in claim 1 wherein, the pulling bullet comprises a unitary body, the securing means comprises a transverse eye in the body, the frangible means is a web of the body adjacent the eye, and said covering means is a part of the body and is retained coupled to the coupling means and is retained covering the light transmitting end of the optical fiber after breaking of the web.

3. The optical cable assembly as recited in claim 2 wherein, a portion of the body has a hexagonal cross section.

4. The optical cable assembly as recited in claim 2 wherein, the coupling means and the body is rotatable with respect to the cable.

5. The optical cable assembly as recited in claim 2 wherein, the body has a tapered nose, and the eye is in the tapered nose.

6. The optical cable assembly as recited in claim 2 wherein, a portion of the body has a cross section larger than the cross section of the optical connector to avoid frictional resistance of the connector when pulled by the pulling bullet along a passage.

7. The optical cable assembly as recited in claim 1 wherein, the pulling bullet comprises a unitary body, the securing means comprises a transverse eye in the body, the frangible means is adjacent the eye, and said covering means is a part of the body and is retained coupled to the coupling means and is retained covering the light transmitting end of the optical fiber after breaking of the frangible means.

8. The optical cable assembly as recited in claim 7 wherein, a portion of the body has a hexagonal cross section.

9. The optical cable assembly as recited in claim 7 wherein, the coupling means and the body is rotatable with respect to the cable.

10. The optical cable assembly as recited in claim 7 wherein, the body has a tapered nose, and the eye is in the tapered nose.

11. The optical cable assembly as recited in claim 7 wherein, a portion of the body has a cross section larger than the cross section of the optical connector to avoid frictional resistance of the connector when pulled by the pulling bullet along a passage.

* * * * *